United States Patent
Nangare

(10) Patent No.: US 11,570,023 B2
(45) Date of Patent: Jan. 31, 2023

(54) NON-LINEAR NEURAL NETWORK EQUALIZER FOR HIGH-SPEED DATA CHANNEL

(71) Applicant: Marvell Asia Pte, Ltd., Singapore (SG)

(72) Inventor: Nitin Nangare, Sunnyvale, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 30 days.

(21) Appl. No.: 17/248,658

(22) Filed: Feb. 2, 2021

(65) Prior Publication Data

US 2022/0150094 A1 May 12, 2022

Related U.S. Application Data

(60) Provisional application No. 63/112,504, filed on Nov. 11, 2020.

(51) Int. Cl.
*H04L 25/03* (2006.01)
(52) U.S. Cl.
CPC .............................. *H04L 25/03057* (2013.01)
(58) Field of Classification Search
CPC . H04L 25/00; H04L 25/0202; H04L 25/0254; H04L 25/03057
See application file for complete search history.

(56) References Cited

U.S. PATENT DOCUMENTS

| | | | | |
|---|---|---|---|---|
| 5,963,929 A | * | 10/1999 | Lo | ...................... H03H 17/0255 706/30 |
| 6,434,084 B1 | | 8/2002 | Schultz et al. | |
| 10,038,575 B1 | * | 7/2018 | Steffan | .................... H04L 27/01 |
| 10,797,805 B1 | * | 10/2020 | Mirfakhraei | ......... G06N 3/0454 |
| 10,833,785 B1 | | 11/2020 | O'Shea et al. | |
| 11,050,494 B2 | * | 6/2021 | Baek | ...................... H04W 52/42 |
| 11,270,200 B2 | * | 3/2022 | Zhang | ............. H04B 10/25133 |
| 2001/0034216 A1 | | 10/2001 | Creigh et al. | |

(Continued)

FOREIGN PATENT DOCUMENTS

EP 2 148 446 1/2010

OTHER PUBLICATIONS

Shvydun et al. U.S. Patent Publication 2014/0146867 (May 29, 2014) Europe 2 148 446 (Jan. 27, 2010).

(Continued)

*Primary Examiner* — Freshteh N Aghdam

(57) ABSTRACT

A receiver for use in a data channel on an integrated circuit device includes a non-linear equalizer having as inputs digitized samples of signals on the data channel, decision circuitry configured to determine from outputs of the non-linear equalizer a respective value of each of the signals, and adaptation circuitry configured to adapt parameters of the non-linear equalizer based on respective ones of the value. The non-linear equalizer may be a neural network equalizer, such as a multi-layer perceptron neural network equalizer, or a reduced complexity multi-layer perceptron neural network equalizer. A method for detecting data on a data channel on an integrated circuit device includes performing non-linear equalization of digitized samples of input signals on the data channel, determining from output signals of the non-linear equalization a respective value of each of the output signals, and adapting parameters of the non-linear equalization based on respective ones of the value.

20 Claims, 10 Drawing Sheets

(56) References Cited

U.S. PATENT DOCUMENTS

2005/0220185 A1* 10/2005 Dowling ........... H04L 25/03057
375/232
2014/0146867 A1  5/2014 Shvydun et al.
2020/0295975 A1* 9/2020 Li ............................ G06N 3/04

OTHER PUBLICATIONS

Sheeja, K.L., et al., "Decision Feedback Equalization Using RBF and MLP Networks," *2010 Second Vaagdevi International Conference on Information Technology for Real World Problems (VCON)*, IEEE, pp. 96-101 (Dec. 9, 2010).

Zerdoumi, Z., et al., "Adaptive Decision Feedback Equalizer Based Neural Network for Nonlinear Channels," *Proceedings of the $3^{rd}$ International Conference on Systems and Control*, Oct. 29-31, 2013 (6 pages).

Zhou, Qingyi, et al., "AdaNN: Adaptive Neural Network-based Equalizer via Online Semi-supervised Learning," ARXIV.Org, Cornell University Library, Jul. 24, 2019 (10 pages).

Shen, J., et al., "Nonlinear Equalization for TDMR Channels Using Neural Networks", *2020 $54^{th}$ Annual Conference on Information Sciences and Systems (CISS)*, IEEE, pp. 1-6 (Mar. 18, 2020).

* cited by examiner

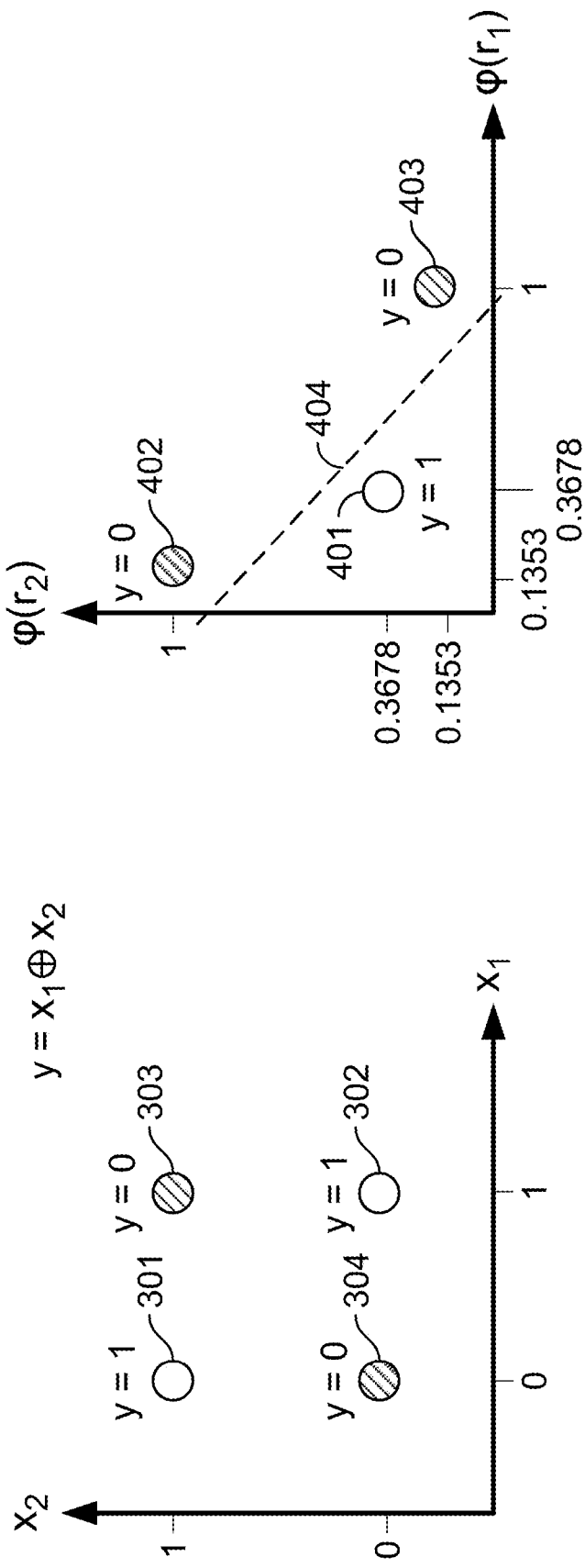

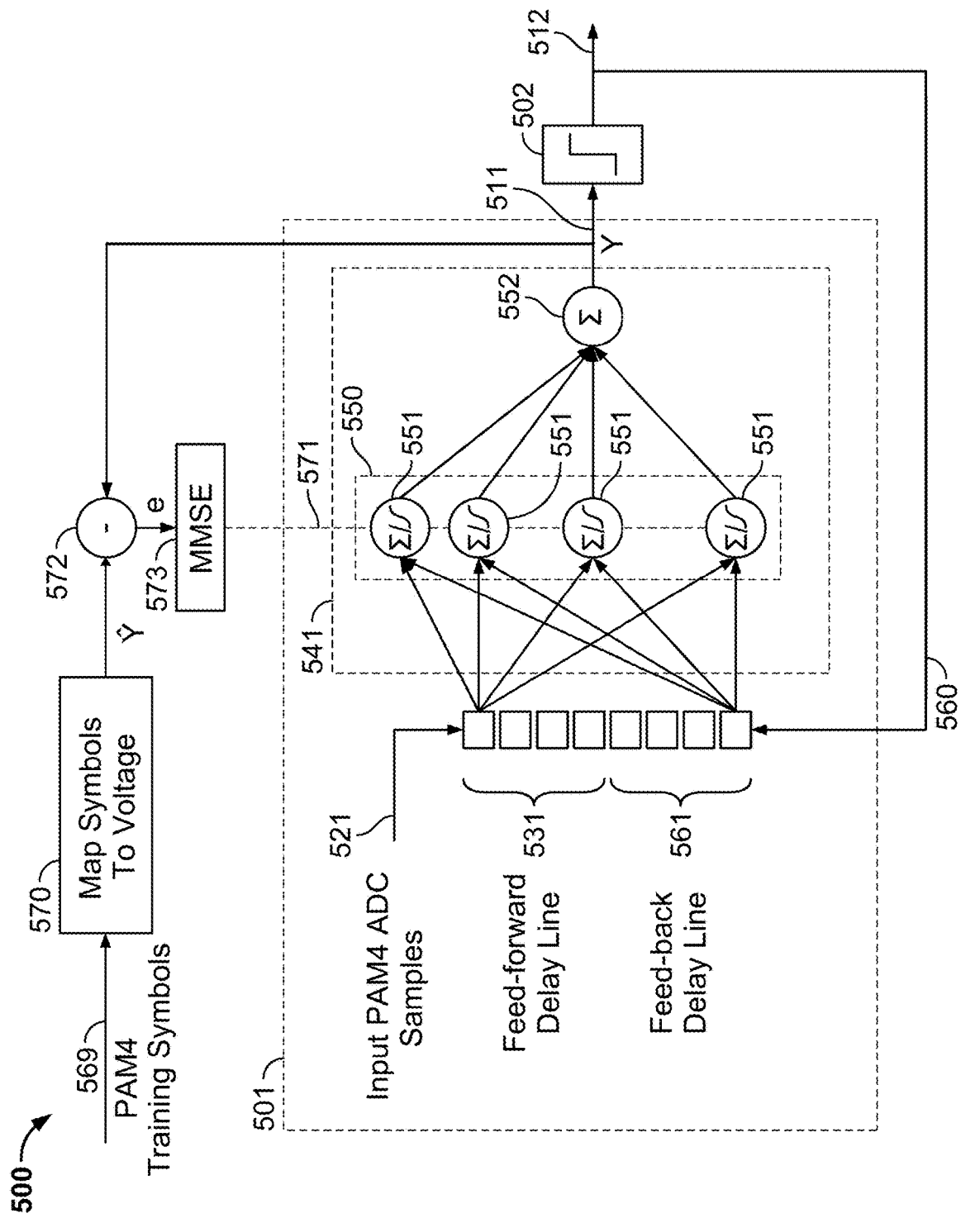

NON-LINEAR NEURAL NETWORK EQUALIZER FOR HIGH-SPEED DATA CHANNEL

CROSS REFERENCE TO RELATED APPLICATION

This disclosure claims the benefit of, commonly-assigned U.S. Provisional Patent Application No. 63/112,504, filed Nov. 11, 2020, which is hereby incorporated by reference herein in its entirety.

FIELD OF USE

This disclosure relates to the use of non-linear equalizers in the receiver side of a high-speed data channel. More particularly, this disclosure relates to the use of non-linear neural-network equalizers in the receiver side of a high-speed SERDES (serializer-deserializer) channel on an integrated circuit device.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

Many integrated circuit devices, particularly "systems-on-chip" (SoCs), include high-speed serial links between various device components (such as the individual silicon dice in an SoC). Typical high-speed serial links of that type, commonly known as "SERDES" (serializer/deserializer), may suffer from significant non-linearity or channel impairment in the signal path, as a result of, e.g., insertion loss, inter-symbol-interference (ISI), and, in an optical system, non-linearities such as dispersion loss, or, in a copper (i.e., wired) system, cross-talk, jitter, etc. Various forms of linear equalization typically are used, at the receiver end of such links, to attempt to mitigate such channel impairments. However, linear equalization may not be sufficient to compensate for such non-linearities, particularly when the data levels to be distinguished are close together.

SUMMARY

In accordance with some implementations of the subject matter of this disclosure, a receiver for use in a data channel on an integrated circuit device includes a non-linear equalizer having as inputs digitized samples of signals on the data channel, decision circuitry configured to determine from outputs of the non-linear equalizer a respective value of each of the signals, and adaptation circuitry configured to adapt parameters of the non-linear equalizer based on respective ones of the value.

A first implementation of such a receiver may further include feedback circuitry configured to feed back, to an input of the non-linear equalizer, a value output by the decision circuitry to mitigate inter-symbol interference.

In a first instance of that first implementation, the feedback circuitry may include a decision-feedback equalizer.

In a second instance of that first implementation, the non-linear equalizer may be a neural network equalizer. In a first variant of that first instance, the neural network equalizer may be a multi-layer perceptron neural network equalizer. In such a variant, the multi-layer perceptron neural network equalizer may be a reduced complexity multi-layer perceptron neural network equalizer.

In a second implementation of such a receiver, the decision circuitry may include thresholding circuitry.

In a first instance of that second implementation, the decision circuitry may operate on symbols, and the thresholding circuitry may have a plurality of thresholds and may select a symbol from a plurality of symbols based on values of outputs of the non-linear equalizer relative to the thresholds.

In a second instance of that second implementation, the decision circuitry may operate on bits, the non-linear equalizer may output a probability estimate for each bit, and the thresholding circuitry may assign a value to each bit based on a comparison of the probability estimate to 0.5.

In a third implementation of such a receiver, the adaptation circuitry may adapts parameters of the non-linear equalizer based on mean square error.

In a fourth implementation of such a receiver, the adaptation circuitry adapts parameters of the non-linear equalizer based on cross-entropy.

In a fifth implementation of such a receiver, the non-linear equalizer may include a linear filter and an non-linear activation function.

In a first instance of that fifth implementation, the non-linear activation function may be a hyperbolic tangent function. In a second instance of that fifth implementation, the non-linear activation function may be a sigmoid function.

According to other implementations of the subject matter of this disclosure, a method for detecting data on a data channel on an integrated circuit device includes performing non-linear equalization of digitized samples of input signals on the data channel, determining from output signals of the non-linear equalization a respective value of each of the output signals, and adapting parameters of the non-linear equalization based on respective ones of the value.

A first implementation of such a method may further include feeding back, to an input of the non-linear equalization, one of the respective values output by the determining, to mitigate inter-symbol interference.

In a second implementation of such a method, performing the non-linear equalization may include performing linear equalization, and applying a non-linear activation function to signals output by the linear equalization.

In a third implementation of such a method, each respective value output by the determining represents a respective candidate symbol, and the adapting may include minimizing mean square error between the respective candidate symbol and a target symbol.

In a fourth implementation of such a method, each respective value output by the determining represents a respective candidate symbol, and the adapting may include determining from the respective candidate symbols an output symbol and a log-likelihood ratio of the output symbol, and minimizing cross-entropy between the output symbol and the log-likelihood ratio of the output symbol.

In a fifth implementation of such a method, each respective value output by the determining represents a respective candidate bit of an output symbol, and the adapting may include determining from each respective candidate bit a respective output bit and a log-likelihood ratio of the respective output bit, and minimizing cross-entropy between each respective candidate bit and the log-likelihood ratio of the respective output bit.

According to still other implementations of the subject matter of this disclosure, apparatus for detecting data on a data channel on an integrated circuit device includes means for performing non-linear equalization of digitized samples of input signals on the data channel, means for determining from output signals of the means for performing non-linear equalization a respective value of each of the output signals, and means for adapting parameters of the non-linear equalization based on respective ones of the value.

A first implementation of such apparatus may further include means for feeding back, to an input of the means for performing non-linear equalization, one of the respective values output by the means for determining, to mitigate inter-symbol interference.

In a second implementation of such apparatus, the means for performing the non-linear equalization may include means for performing linear equalization, and means for applying a non-linear activation function to signals output by the means for performing linear equalization.

In a third implementation of such apparatus, each respective value output by the determining represents a respective candidate symbol, and the means for adapting may include means for minimizing mean square error between the respective candidate symbol and a target symbol.

In a fourth implementation of such apparatus, each respective value output by the means for determining represents a respective candidate symbol, and the means for adapting may include means for determining from the respective candidate symbols an output symbol and a log-likelihood ratio of the output symbol, and means for minimizing cross-entropy between the output symbol and the log-likelihood ratio of the output symbol.

In a fifth implementation of such apparatus, each respective value output by the determining represents a respective candidate bit of an output symbol, and the means for adapting may include means for determining from each respective candidate bit a respective output bit and a log-likelihood ratio of the respective output bit, and means for minimizing cross-entropy between each respective candidate bit and the log-likelihood ratio of the respective output bit.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which:

FIG. 3 is a plot of an exclusive-OR function in a Cartesian coordinate space illustrating a problem solved by implementations of the subject matter of this disclosure;

FIG. 4 is a plot of a transformation of the exclusive-OR function of FIG. 3 into a different coordinate space illustrating a solution based on implementations of the subject matter of this disclosure;

FIG. 5 is a diagram of a first implementation of a receiver incorporating the subject matter of this disclosure;

DETAILED DESCRIPTION

Figure 1:
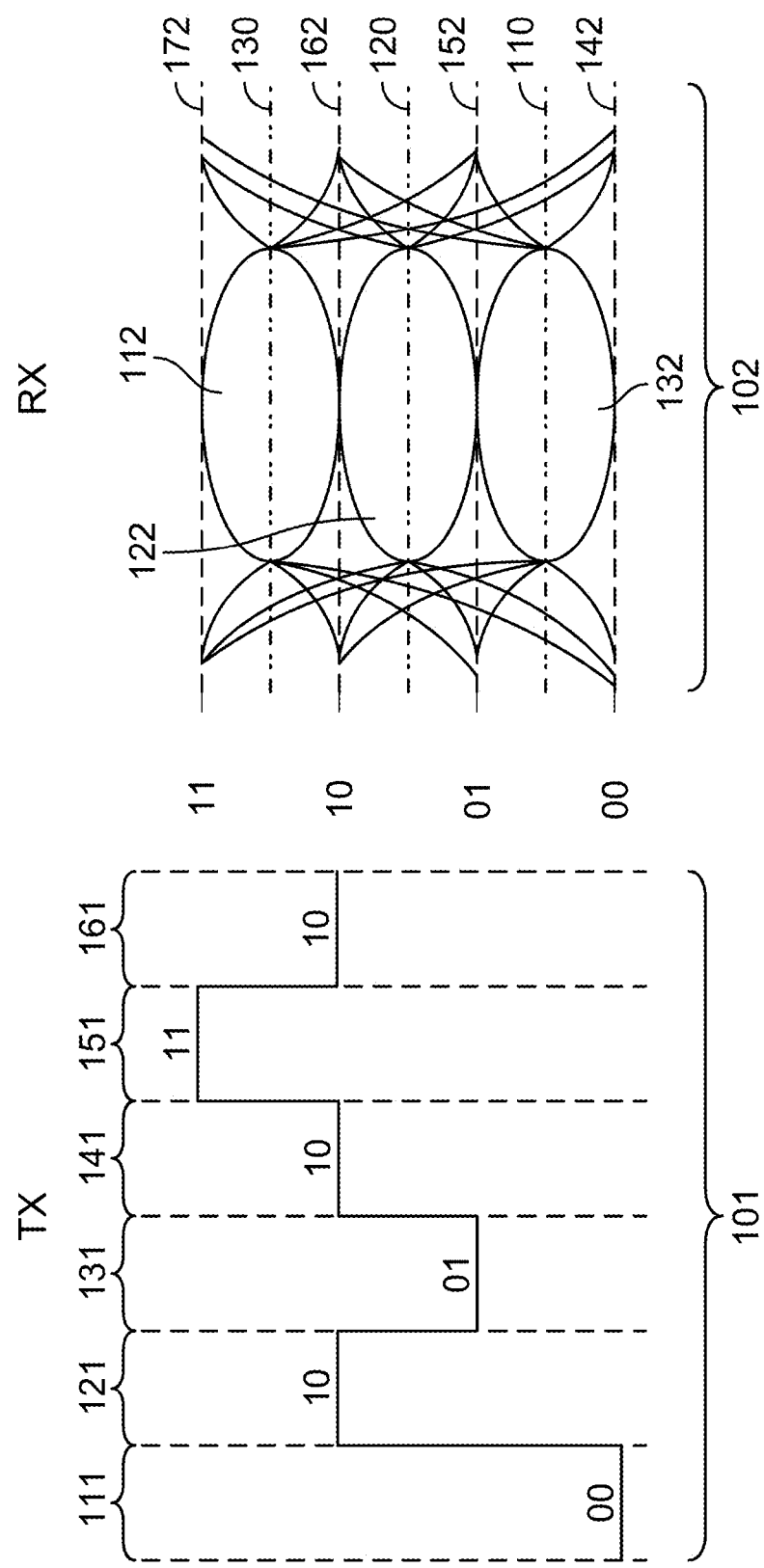
FIG. 1 shows two different graphical representations of example signals which may be processed according to implementations of the subject matter of this disclosure.

As noted above, integrated circuit devices may include high-speed SERDES links between various device components. Typical SERDES links may suffer from significant non-linearity or channel impairment in the signal path, as a result of, e.g., insertion loss, inter-symbol-interference (ISI), and, in an optical system, non-linearities such as dispersion loss or, in a copper (i.e., wired) system, cross-talk, jitter, etc. Various forms of linear equalization typically are used, at the receiver end of such links, to attempt to deal with such channel impairments.

However, linear equalization may not be sufficient to compensate for such non-linearities, particularly when the data levels to be distinguished are close together. For example, as opposed to typical non-return-to-zero (NRZ) signaling, which uses two levels to represent '0' and '1', a SERDES in an SoC device may use 4-level pulse-amplitude modulation (PAM4) signaling having four voltage levels, but with the same maximum voltage swing as NRZ signaling, to represent four possible two-bit symbols ('00', '01', '10', '11'). Thus, rather than one threshold within that voltage range dividing between two signal levels, there are three thresholds within the voltage range, dividing among four signal levels. And in some cases, higher-order signaling such as 8-level pulse-amplitude modulation (PAM8) or 16-level pulse-amplitude modulation (PAM16), where the signal levels are even closer together, is used. Linear equalization may not be enough to correctly assign samples near the thresholds between levels to the correct side of the threshold when the thresholds are close together.

In accordance with implementations of the subject matter of this disclosure, non-linear equalization is used to compensate for non-linearities in the SERDES channel, thereby reducing the bit-error rate (BER). In different implementations, different types of non-linear equalizers may be used.

Conceptually, a linear equalizer performs the separation of samples for assignment to one level or another by effectively drawing a straight line between groups of samples plotted in a two-dimensional (e.g., (x,y)) space. In channels that are insufficiently linear, or where the levels are too close together, there may not be a straight line that can be drawn between samples from different levels on such a plot. A non-linear equalizer effectively re-maps the samples into a different space in which the samples from different levels may be separated by a straight line or other smooth curve.

A non-linear equalizer in accordance with implementations of the subject matter of this disclosure may be more or less complex. For example, a non-linear equalizer may have more or fewer variables, or taps, with complexity being proportional to the number of variables. In addition, a non-linear equalizer that operates at the bit level—i.e., operates separately on the bits of each symbol (e.g., two bits/symbol for PAM4 signaling) rather than on the symbol as a whole—may be less complex than a non-linear equalizer that operates at the symbol level. Either way, greater complexity yields greater performance when all other considerations are equal. However, greater complexity also may require greater device area and/or power consumption.

Types of non-linear equalizers that may be used in accordance with the subject matter of this disclosure may include multi-layer perceptron neural network (MLPNN) equalizers, and reduced-complexity multi-layer perceptron neural network (RC-MLPNN) equalizers. The non-linear equalizer may incorporate, or be supplemented by, a decision-feedback equalizer to filter out the contribution of a previous result to mitigate inter-symbol interference.

Performance of the non-linear equalizer may be affected by the cost function used for adaptation of the equalizer. For example, according to implementations of the subject matter of this disclosure, the non-linear equalizer may use one of various different cost functions for adaptation, including either a minimum mean-square error (MMSE or MSE) cost function, or a cross-entropy (CE)-based cost function. A CE-based cost function may yield a better result than an MMSE cost function, but a CE-based cost function is more complex than an MMSE cost function.

Therefore, according to implementations of the subject matter of this disclosure, the choice of which form of non-linear equalizer to use, and of which cost function to use, may be a tradeoff of cost versus performance.

The subject matter of this disclosure may be better understood by reference to FIGS. 1-11.

Figure 2:
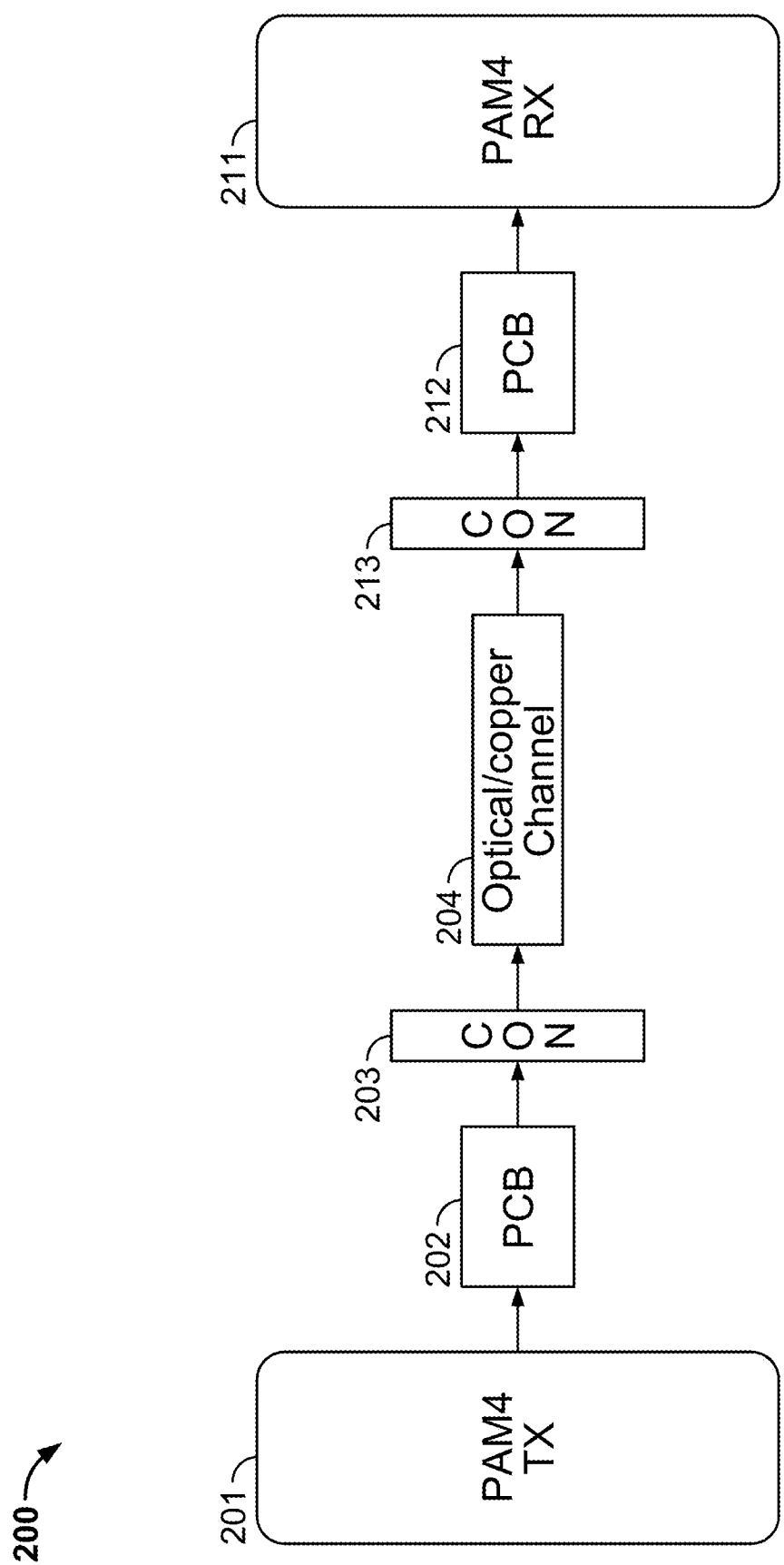
FIG. 2 is a schematic representation of a SERDES channel with which implementations of the subject matter of this disclosure may be used.
Figure 6:
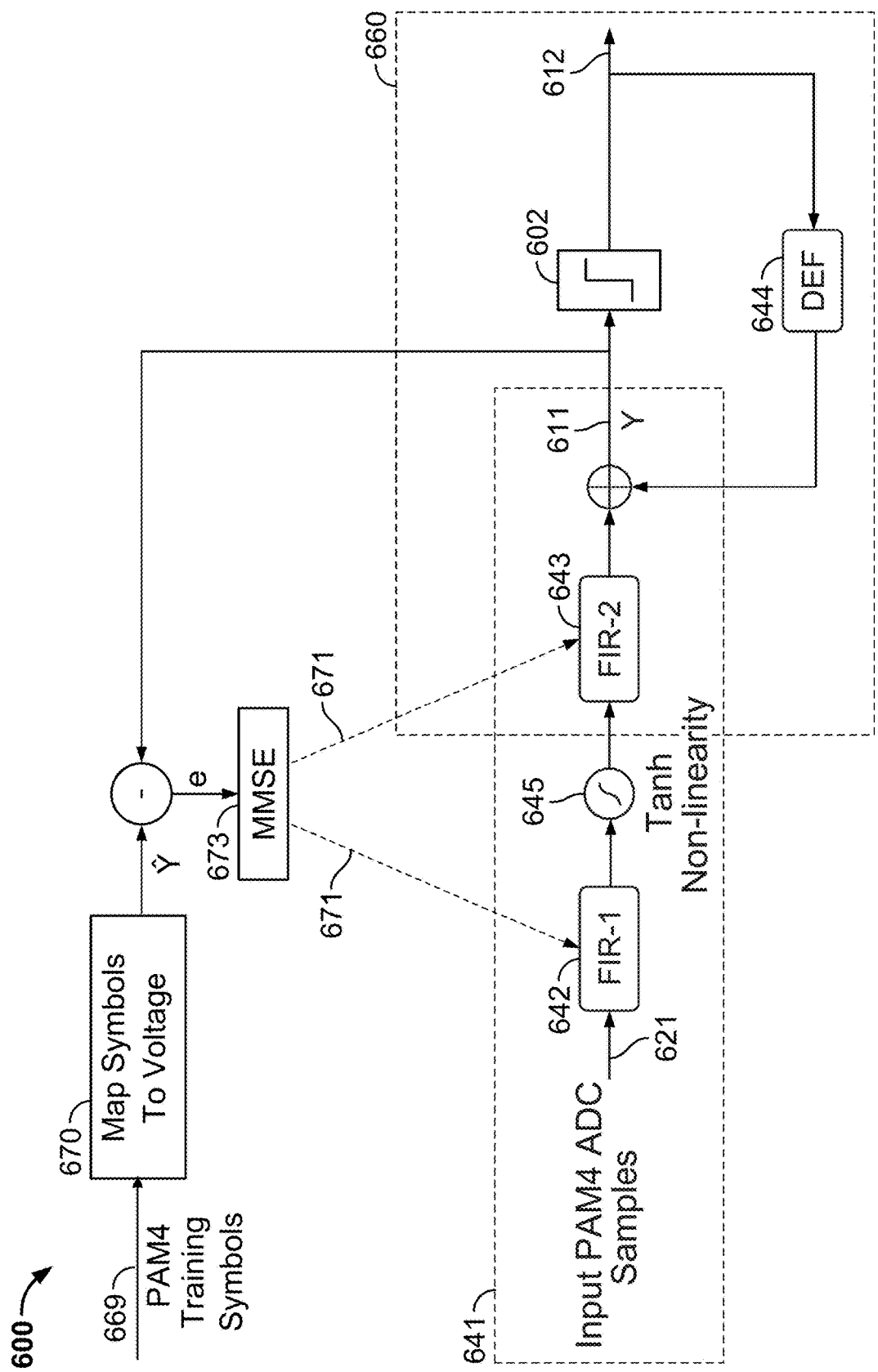
FIG. 6 is a diagram of a second implementation of a receiver incorporating the subject matter of this disclosure.

FIGS. 1 and 2 illustrate the transmission and reception/detection of a PAM4 signal, as may occur on a SERDES channel 200 with which implementations of the subject matter of this disclosure may be used. A set 101 of six two-bit symbols 111 ('00'), 121 ('10'), 131 ('01'), 141 ('10'), 151 ('11'), 161 ('10') is transmitted from the transmit end 201 of channel 200 which, in a particular implementation of a physical topology, may be mounted on a transmitter printed circuit board (PCB) 202, coupled by a connector 203 to a channel medium 204. Channel medium 204 may be an optical (e.g., fiber) channel, or may be a wired channel (e.g., copper wire or PCB trace). At the receive end of channel 200, PAM4 receiver 211 may be mounted on a receiver PCB 212 coupled by a connector 213 to channel medium 204.

Eye diagrams 102 represent the idealized received signals 111-116, with well-defined data eyes 112, 122, 132. The finely-dashed lines 142, 152, 162, 172 represent the actual voltage levels for the four data symbol values '00', '01', '10' and '11', respectively. The coarsely-dashed lines 110, 120, 130 represent detection thresholds separating the four data symbol values '00', '01', '10' and '11'. In some implementations, the symbol value is determined by a slicer (i.e., a multi-level comparator; not shown in FIG. 1 or 2), designating any signal below threshold 110 as '00', any signal at or above threshold 110 and below threshold 120 as '01', any signal at or above threshold 120 and below threshold 130 as '10', and any signal at or above threshold 130 as '11'.

However, in a real-world, non-idealized situation, with non-linearities in the channel, samples representing particular symbol values may not fall neatly between the thresholds as might be expected in an idealized channel. Taking only the '00' and '01' symbols as an illustration, in a non-linear channel, while most '00' samples will be at or below threshold 110 (and below threshold 120), there may be '00' samples at or above threshold 110 and '01' samples below threshold 110 (and at or above threshold 120).

The purpose of implementing equalization on the channel is to correct for various sources of interference referred to above and thereby effectively move samples that are on the wrong side of the threshold to the correct side of the threshold. Linear equalization effectively takes a plot of the samples in a two-dimensional (x,y) space and draws a straight line through the samples where the threshold ought to be. However, in a channel with non-linearities, there may be no straight line that can be drawn on that two-dimensional plot that would correctly separate the samples. In such a case, non-linear equalization can be used. Non-linear equalization may effectively remap the samples into a different space in which there does exist a straight line that correctly separates the samples.

Alternatively, the non-linear equalization function may remap the samples into a space in which there exists some smooth curve other than a straight line that correctly separates the samples. For example, the non-linear equalization function may remap the samples into a polar-coordinate or radial space in which the samples are grouped into circular or annular bands that can be separated by circles or ellipses.

The advantage of non-linear equalization over linear equalization in a non-linear channel may be seen in a simplified illustration as shown in FIGS. 3 and 4, where the signal to be equalized is characterized by the exclusive-OR (XOR or $\oplus$) function. FIG. 3 is plot of $y=x_1 \oplus x_2$ in $(x_1, x_2)$ space, where the open dots 301, 302 represent y=0 and cross-hatched dots 303, 304 represent y=1. It is apparent that there is no straight line that can be drawn separating the open dots from the cross-hatched dots.

However, a radial basis function $$\varphi(r_i) = \varphi(\|x - c_i\|) = e^{-\left\|\begin{bmatrix}x_1\\x_2\end{bmatrix} - c_i\right\|^2}$$

can be used to transform the XOR function from the linear Cartesian $(x_1, x_2)$ space to a non-linear radial $(\varphi(r_1), \varphi(r_2))$ space as follows

| $x_1$ | $x_2$ | $\varphi(r_1)$ | $\varphi(r_2)$ | y |
|---|---|---|---|---|
| 0 | 0 | 0.1353 | 1 | 0 |
| 0 | 1 | 0.3678 | 0.3678 | 1 |
| 1 | 0 | 0.3678 | 0.3678 | 1 |
| 1 | 1 | 1 | 0.1353 | 0 | which is diagrammed in FIG. 4. As can be seen, when mapped into the non-linear radial $(\varphi(r_1), \varphi(r_2))$ space, the values 401, 402, 403 (as can be seen, both of the two y=1 points 301, 302 in $(x_1, x_2)$ space map to the same point 401 in $(\varphi(r_1), \varphi(r_2))$ space) of the XOR function 400 may be separated by straight line 404.

As discussed below, various types of non-linear equalizers are available. Whatever type of non-linear equalizer is used may be adaptive to account for changing channel conditions. Various forms of adaptation may be used.

One type of adaptation function that may be used is minimum mean-squared error (MMSE), where the mean-squared error (MSE) is defined as the square of the norm of the difference between the equalized signal (Y) and the ideal signal (Ŷ). The equalizer may initially be adapted in a training mode in which the ideal signal values are available. Later, during run-time operation, the detected output values of the equalized channel should be close enough to the ideal values to be used for adaptation.

Another type of adaptation function that may be used is the cross-entropy (CE) between a training bit and its log-likelihood ratio (LLR). In particular, cost function circuitry may be configured to compute a cross-entropy value indicative of a difference between a probability distribution of the LLR signal and a probability distribution of the training bit value. The cost function circuitry then adapts the equalizer by setting an equalizer parameter (e.g., one or more coefficients of filter taps of the equalizer) to a value that corresponds to a minimum cross-entropy value from among the computed cross-entropy value and one or more previously computed cross-entropy values, to decrease a bit-error rate for the channel. As in the case of MSE equalization, the equalizer may initially be adapted in a training mode in which the ideal signal values are available. Later, during run-time operation, the detected output values of the equalized channel should be close enough to the ideal values to be used for adaptation. Specifically, if any forward error correction code (FEC) decoder (e.g., a Reed Solomon (RS) decoder or Low-Density Parity Check (LDPC) decoder) is available after the equalizer, then successfully decoded frames from the FEC decoder output may be used for adaptation.

LLR may be defined as the relationship between the probability ($P_0$) of a bit being '0' and the probability ($P_1$) of a bit being '1':

$$LLR = L = \log\left(\frac{P_1}{P_0}\right)$$

$$P_1 + P_0 = 1$$

$$P_0 = \frac{1}{(1 + e^L)}$$

$$P_1 = \frac{e^L}{(1 + e^L)}$$

The cross-entropy between a training bit and its LLR may be computed as follows:

$$\text{Cross Entrophy}(bit, LLR) = -P(bit=0) \cdot \log(P_0) - P(bit=1) \cdot \log(P_1)$$

$$\text{Cross Entrophy}(bit, LLR) = -(1-bit) \cdot \log(P_0) - bit \cdot \log(P_1)$$

$$\text{Cross Entropy} = \text{Inf} \quad \text{when} \begin{cases} bit=0, P_0=0 \\ bit=1, P_1=0 \end{cases}$$

$$\text{Cross Entropy} = 0 \quad \text{when} \begin{cases} bit=0, P_0=1 \\ bit=1, P_1=1 \end{cases}$$

When the true bit is a logic '0' but the probability of the detected bit represented by the LLR indicates that $P_0=0$, or the true bit is a logic '1' but the probability of the detected bit represented by the LLR indicates that $P_1=0$, then the true value is the complete opposite of the expected value, meaning that cost (cross-entropy) approaches infinity. On the other hand, when the probability of a detected bit value as indicated by the LLR agrees with the true bit value, then cross-entropy equals zero. Insofar as in most cases both probabilities $P_0$ and $P_1$ are higher than 0 and lower than 1, cross-entropy will be a finite non-zero value. Thus, this cost function can be used for adaptation and reflects the quality of the detected bits, with the goal being to minimize cross-entropy.

The gradient of cross-entropy with respect to the LLR may be computed by substituting for $P_0$ and $P_1$ in the cross-entropy equation:

$$\frac{\partial(CE)}{\partial(LLR)} = P_1 - bit = \begin{cases} P_1 & \text{when bit} = 0 \\ P_1 - 1 = -P_0 & \text{when bit} = 1 \end{cases}$$

The LLR may be adapted to minimize cross-entropy $$\left(\text{i.e., } \frac{\partial(CE)}{\partial(LLR)} = 0\right),$$

as follows:

$$LLR_{t+1} = LLR_t - \alpha \cdot P_1 \text{ if bit=0}$$

$$LLR_{t+1} = LLR_t + \alpha \cdot P_0 \text{ if bit=1}$$

A negative LLR means bit=0 has a higher probability than bit=1, while a positive LLR means bit=1 has a higher probability than bit=0. In these equations, $P_0$ and $P_1$ are probabilities and therefore are positive values, and a is an adaptation bandwidth which also is positive. Therefore, when the true bit=0 then adaptation using cross-entropy will make a negative LLR more negative, and when the true bit=1 then adaptation using cross-entropy will make a positive LLR more positive. Therefore, cross-entropy-based adaptation maximizes the magnitude of the LLR and hence is a maximum-likelihood adaptation which reduces BER. Thus, adaptation of the equalizer to minimize cross-entropy also minimizes BER.

If one assumes that there is a general computation graph from parameter X→Y→LLR→CE such that parameter X affects the value of output Y which affects the LLR, from which the cross-entropy may be computed, then the cross-entropy gradient can be expressed in terms of other parameters:

$$\frac{\partial(CE)}{\partial(parameter_X)} = \frac{\partial(parameter_Y)}{\partial(parameter_X)} \cdot \frac{\partial(LLR)}{\partial(parameter_Y)} \cdot \frac{\partial(CE)}{\partial(LLR)}$$

Therefore, any parameter can be adapted to minimize the cross-entropy.

FIG. 5 shows an implementation 500 of receiver 211 according to the subject matter of this disclosure. Receiver 500 includes a non-linear equalizer 501 in the form of multi-layer perceptron neural network 541 providing an equalized signal (Y) 511 from input digitized samples 521 that are delayed at 531 and combined in multi-layer perceptron neural network 541. A slicer 502 provides an output decision 512 that is fed back to multi-layer perceptron neural network 541 to mitigate inter-symbol interference from a previous symbol.

As seen in FIG. 5, multi-layer perceptron neural network 541 includes at least one hidden layer 550 of hidden nodes 551. In this drawing only one hidden layer 550 is shown, but a multi-layer perceptron neural network equalizer in accordance with implementations of the subject matter of this disclosure may have multiple hidden layers (not shown). Similarly, while FIG. 5 shows four hidden nodes 551 in hidden layer 550, each hidden layer in a multi-layer perceptron neural network equalizer in accordance with implementations of the subject matter of this disclosure may have more or fewer hidden nodes 551, reflecting the number of parameters (filter tap coefficients).

Each hidden node 551 multiplies delayed samples (to avoid crowding the drawing, only one of delays 531 is shown as being coupled to nodes 551; however, each delay 531 is coupled to nodes 551) by parameters (filter tap coefficients; not shown) and then sums (Σ) the filter taps. Each hidden node 551 then applies to its computed sum a non-linear activation function (e.g., a hyperbolic tangent activation function, tan h (ƒ), although other non-linear activation functions may be used), to generate a node output, which is then passed to the next layer, and so on. The final layer 552 does not have non-linear activation function but simply sums its inputs.

Hidden nodes 551 receive inputs not only from feed-forward delays 531, but also from feed-back delays 561, representing samples of a fed-back prior symbol decision 560, for mitigating inter-symbol interference.

The aforementioned parameters of non-linear equalizer 501 are adapted based on the output Y. One approach for adapting the parameters of non-linear equalizer 501 is to compute at 572 the error (e) with respect to an ideal sample $\hat{Y}$ derived from PAM4 training symbols 569 which are then mapped at 570 to respective ideal voltages (e.g., −1 for '00', −⅓ for '01', +⅓ for '10' and +1 for '11'). Minimization of the mean square error at 573 is then used as the cost function to adapt the filter tap coefficients at nodes 551 as indicated at 571.

As an alternative to multi-layer perceptron neural network 541, an implementation 600 (FIG. 6) of receiver 211 according to the subject matter of this disclosure may include a reduced-complexity multi-layer perceptron neural network 641, coupled with a decision-feedback equalizer 644. Receiver 600 provides an equalized signal (Y) 611 from input digitized samples 621. Reduced-complexity multi-layer perceptron neural network 641 includes two feed-forward filters 642, 643, which may, e.g., be finite impulse response (FIR) filters. A slicer 602 provides an output decision 612 that is fed back through decision-feedback equalizer (DFE) 644 and combined with the output of second feed-forward filter 643 to mitigate inter-symbol interference from a previous symbol. Receiver 600 resembles a linearly-equalized receiver 660 (including FIR filter 643, DFE 644 and slicer 602), having as its input the output of an additional feed-forward filter 642 to which a non-linear activation function 645 (e.g., a hyperbolic tangent activation function, tan h (ƒ), although other non-linear activation functions may be used) has been applied.

Similarly to the case of non-linear equalizer 501 in receiver 500, the parameters of non-linear equalizer 601 are adapted based on the output Y. One approach for adapting the parameters of non-linear equalizer 601 is to compute the error (e) with respect to an ideal sample $\hat{Y}$ derived from PAM4 training symbols 669 which are then mapped at 670 to respective ideal voltages (e.g., −1 for '00', −⅓ for '01', +⅓ for '10' and +1 for '11'). Minimization of the mean square error at 673 is then used as the cost function to adapt the filter tap coefficients of FIR filters 642, 643 as indicated at 671.

However, as described above, cross-entropy may serve as a more effective cost function for adapting the parameters of a non-linear equalizer to minimize BER.

Figure 7:
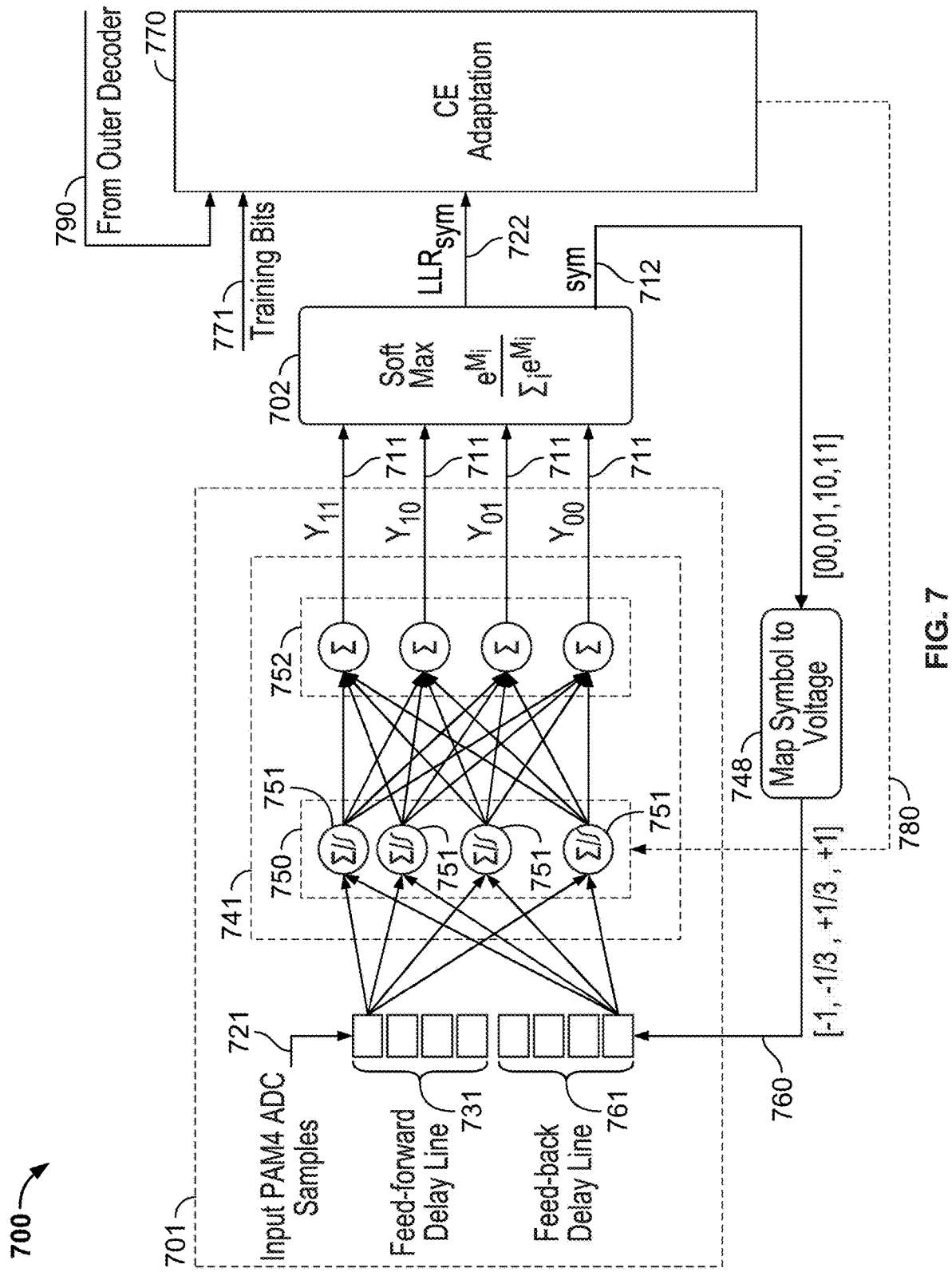
FIG. 7 is a diagram of a third implementation of a receiver incorporating the subject matter of this disclosure.

FIG. 7 shows an implementation 700 of receiver 211 according to the subject matter of this disclosure. Receiver 700 includes a non-linear equalizer 701 in the form of multi-layer perceptron neural network 741 providing four separate equalized signals ($Y_{ij}$; i=0, 1; j=0, 1) 711 from input digitized samples 721 that are delayed at 731 and combined in multi-layer perceptron neural network 741. A softmax function:

$$\frac{e^{M_i}}{\Sigma_i e^{M_i}}$$

implemented in circuitry 702 provides an output decision (sym) 712, which is fed back (after conversion at 748 to a voltage—e.g., −1 for '00', −⅓ for '01', +⅓ for '10' and +1 for '11') to multi-layer perceptron neural network 741 to mitigate inter-symbol interference from a previous symbol, and an output log-likelihood ratio ($LLR_{sym}$) 722.

As in the case of FIG. 5, multi-layer perceptron neural network 741 includes at least one hidden layer 750 of hidden nodes 751. In this drawing only one hidden layer 750 is shown but a multi-layer perceptron neural network equalizer in accordance with implementations of the subject matter of this disclosure may have multiple hidden layers (not shown). Similarly, while FIG. 7 shows four hidden nodes 751 in hidden layer 750, each hidden layer in a multi-layer perceptron neural network equalizer in accordance with implementations of the subject matter of this disclosure may have more or fewer hidden nodes 751, reflecting the number of parameters (filter tap coefficients).

Each hidden node 751 multiplies delayed samples (to avoid crowding the drawing, only one of delays 731 is shown as being coupled to nodes 751; however, each delay 731 is coupled to nodes 751) by parameters (filter tap coefficients; not shown) and then sums (Σ) the filter taps. Each hidden node 751 then applies to its computed sum a non-linear activation function (e.g., a hyperbolic tangent activation function, tan h (ƒ), although other non-linear activation functions may be used), to generate a node output, which is then passed to the next layer, and so on. The final layer 752 does not have non-linear activation function but simply sums its inputs separately for each of the four symbols.

Hidden nodes 751 receive inputs not only from feed-forward delays 731, but also from feed-back delays 761, representing samples of a fed-back prior symbol decision 760, for mitigating inter-symbol interference.

Because equalizer 701 provides soft output in the form of an LLR, the output may be used with a further outer decoder (not shown), which may be a forward error-correcting (FEC) decoder such as a low-density parity check (LDPC) decoder or a Reed-Solomon decoder.

The aforementioned parameters of non-linear equalizer 701 may be adapted to minimize cross-entropy, using cross-entropy adaptation circuitry 770, between a training symbol ($\widetilde{sym}$) that is obtained by grouping training bits 771, and output log-likelihood ratio ($LLR_{sym}$) 722. Cross-entropy adaptation circuitry 770 is able to adjust parameters of non-linear equalizer 701, at 780, to minimize the cross-entropy between the training symbol ($\widetilde{sym}$) and the probability of the detected symbol which is represented by $LLR_{sym}$ 722. During run-time, output bits 790 of an outer decoder (such as a Forward Error Correcting, or FEC, decoder; not shown), but only from successfully decoded frames, may be used in place of training bits 771.

Figure 8:
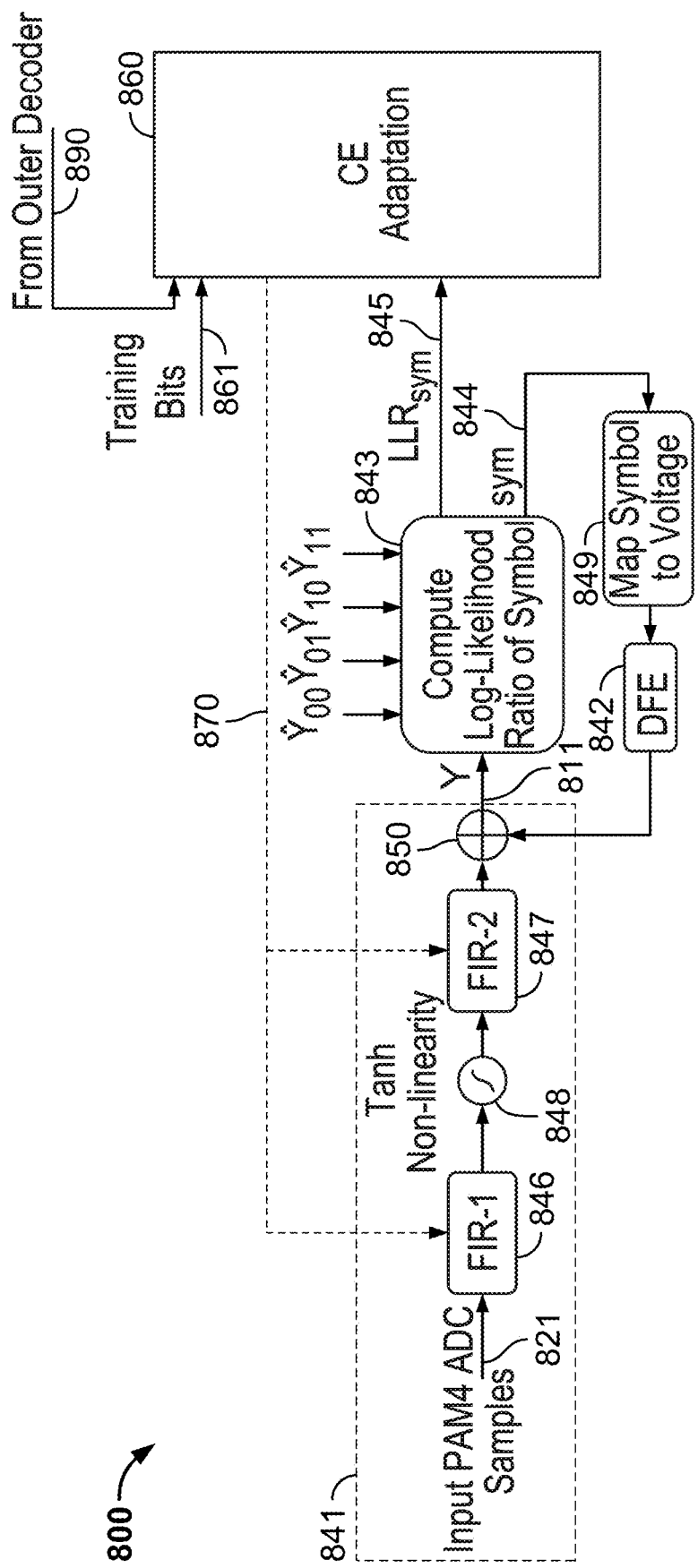
FIG. 8 is a diagram of a fourth implementation of a receiver incorporating the subject matter of this disclosure.

FIG. 8 shows an implementation 800 of receiver 211 according to the subject matter of this disclosure including a reduced-complexity multi-layer perceptron neural network 841, coupled with a decision-feedback equalizer 842, as well as log-likelihood ratio circuitry 843 that inputs an equalized signal (Y) 811 derived from input digitized samples 821, and outputs a symbol decision (sym) 844 and a log-likelihood ratio (LLRs) 845 of that symbol decision, based on target symbol values $\hat{Y}_{00}, \hat{Y}_{01}, \hat{Y}_{10}, \hat{Y}_{11}$.

Reduced-complexity multi-layer perceptron neural network 841 includes two feed-forward filters 846, 847, which may, e.g., be finite impulse response (FIR) filters. A non-linear activation function 848 (e.g., a hyperbolic tangent activation function, tan h $(f)$), although other non-linear activation functions may be used) is applied to the output of feed-forward filter 846 which is then input to feed-forward filter 847. Symbol decision 844 is converted at 849 to a voltage for input to decision-feedback equalizer 842, the output of which is combined at 850 with the output of feed-forward filter 847 to mitigate inter-symbol interference from a previous symbol, to yield equalized signal (Y) 811.

The parameters of feed-forward filters 846, 847 may be adapted to minimize cross-entropy between output log-likelihood ratio ($LLR_{sym}$) 845 and "true" symbols obtained from true bits which may be training bits or, during run-time, the output of a further outer decoder (not shown). Cross-entropy adaptation circuitry 860 has as an input the output log-likelihood ratio ($LLR_{sym}$) 845. In a training mode, cross-entropy adaptation circuitry 860 also has as inputs known training bits 861, which serve as "true" bits which are then grouped to obtain true symbols. Cross-entropy adaptation circuitry 860 is able to adjust parameters of feed-forward filters 846, 847, at 870, by minimizing the cross-entropy between the training symbol obtained by grouping training bits ($\overline{sym}$) and the probability of the detected symbol which is represented by output log-likelihood ratio ($LLR_{sym}$) 845. At run-time, output bits 890 of an outer decoder (such as an FEC decoder; not shown), but only from successfully decoded frames, may be used in place of training bits 861.

Figure 9:
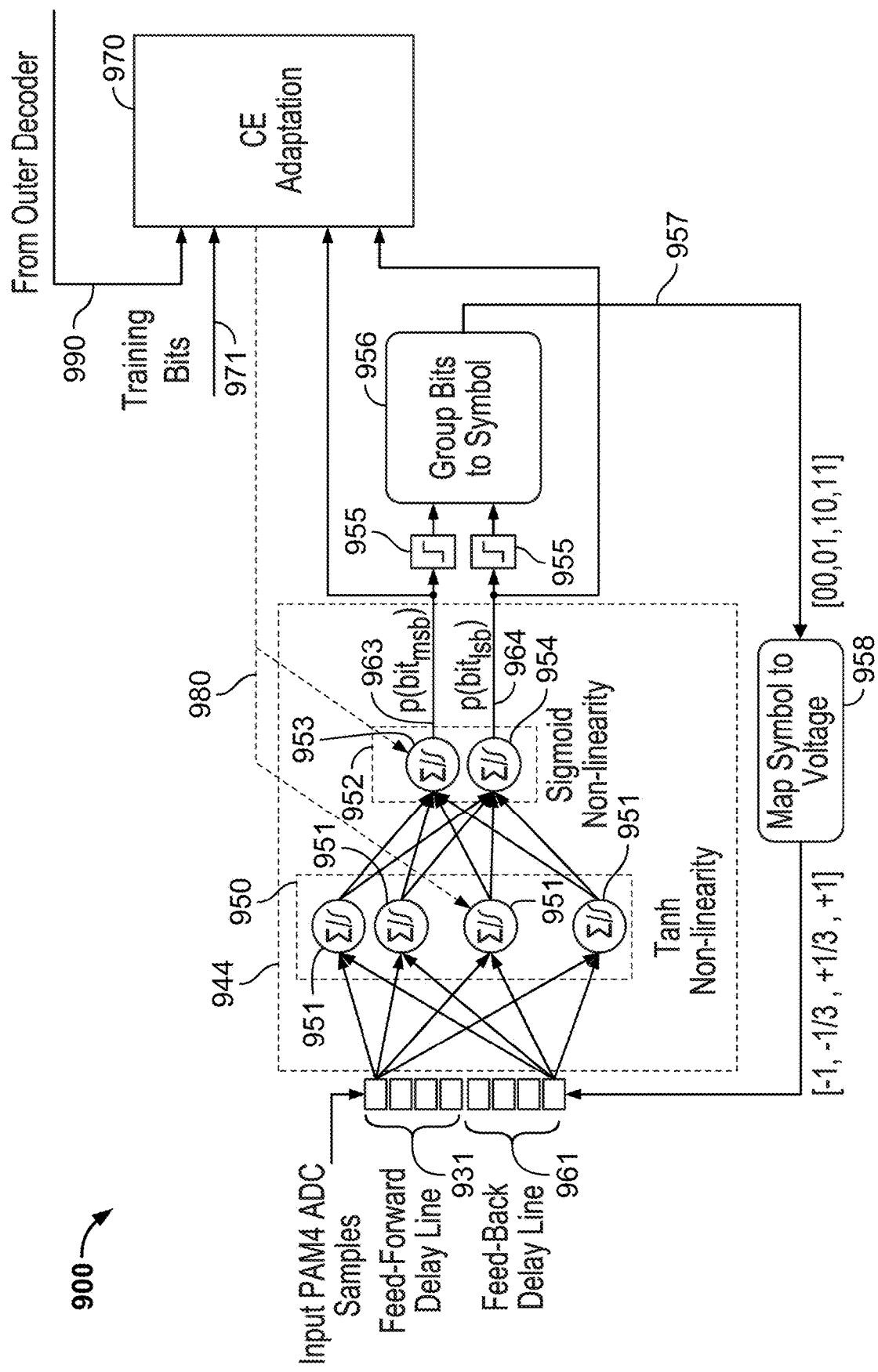
FIG. 9 is a diagram of a fifth implementation of a receiver incorporating the subject matter of this disclosure.

Because a neural network equalizer is capable of decorrelating the two bits in a PAM4 symbol, a further implementation 900 of receiver 211 according to implementations of the subject matter of this disclosure may be provided (FIG. 9). Receiver 900 includes an MLPNN equalizer 941 similar to MLPNN equalizer 541 in that it includes at least one hidden layer 950 of hidden nodes 951 in which samples delayed at 931 (to avoid crowding the drawing, only one of delays 931 is shown as being coupled to nodes 951; however, each delay 931 is coupled to nodes 951) are multiplied by parameters (filter tap coefficients; not shown) and then the filter taps are summed ($\Sigma$). Each hidden node 951 then applies to its computed sum a non-linear activation function (e.g., a hyperbolic tangent activation function, tan h $(f)$, although other non-linear activation functions may be used), to generate a node output, which is then passed to the next layer, and so on.

MLPNN 941 differs from MLPNN 541 in that the final layer 952 includes two nodes 953, 954, in which the inputs are not merely summed as in layer 552 of MLPNN 541, but also have applied after summation a non-linear activation function, different from the non-linear activation function of nodes 951, that decorrelate the two bits of each symbol, with each node 953, 954 providing one of the two bits. The non-linear activation function of each node 953, 954 may be, instead of a hyperbolic tangent activation function, a sigmoid function having a profile similar to that of tan h $(f)$, but ranging from 0 to +1 rather than from −1 to +1.

Node 953 provides a probability estimate 963 ($p(bit_{msb})$) for the most significant bit of the two bits in a symbol, and node 954 provides a probability estimate 964 ($p(bit_{lsb})$) for the least significant bit of the two bits of the symbol. The two probability estimates 963, 964 are then compared in slicers 955 to a threshold value of 0.5 to a obtain bit estimate (e.g., bit=0 if p<0.5 and bit=1 if p≥0.5) for each bit in the symbol.

At 956, the separate bits are grouped back into a symbol, then fed back at 957 and converted to a corresponding voltage at 958 (e.g., −1 for '00', −⅓ for '01', +⅓ for '10' and +1 for '11') for input to feed-back delays 961, representing samples of a fed-back prior symbol decision relative to the next inputs from feed-forward delays 931, for mitigating inter-symbol interference.

Because implementation 900 operates at the bit level rather than at the symbol level, cross-entropy adaptation circuitry 970 also operates at the bit level, determining the cross-entropy based on the separate bit-level probabilities 963, 964 and the training bits 971, or at run-time, the output 990 of an outer decoder (such as an FEC decoder; not shown).

At the bit level, cross-entropy may be determined by first determining the log-likelihood ratios from the probability estimates as described above. Starting with the most significant bit, where $P_0$ is $p(bit_{msb=0})$ and $P_1$ is $p(bit_{msb=1})$, $LLR(bit_{msb})$ can be computed. $CE(bit_{msb})$ can then be computed from $LLR(bit_{msb})$ and the most significant bit of the training bits or the outer decoder bits. Then using $p(bit_{lsb=0})$ as $P_0$ and $p(bit_{lsb=1})$ and $P_1$, $LLR(bit_{lsb})$ can be computed. $CE(bit_{lsb})$ can then be computed from $LLR(bit_{lsb})$ and the least significant bit of the training bits or the outer decoder bits. The bit level cross-entropy is the sum of CE ($bit_{msb}$)+ CE ($bit_{lsb}$).

Figure 10:
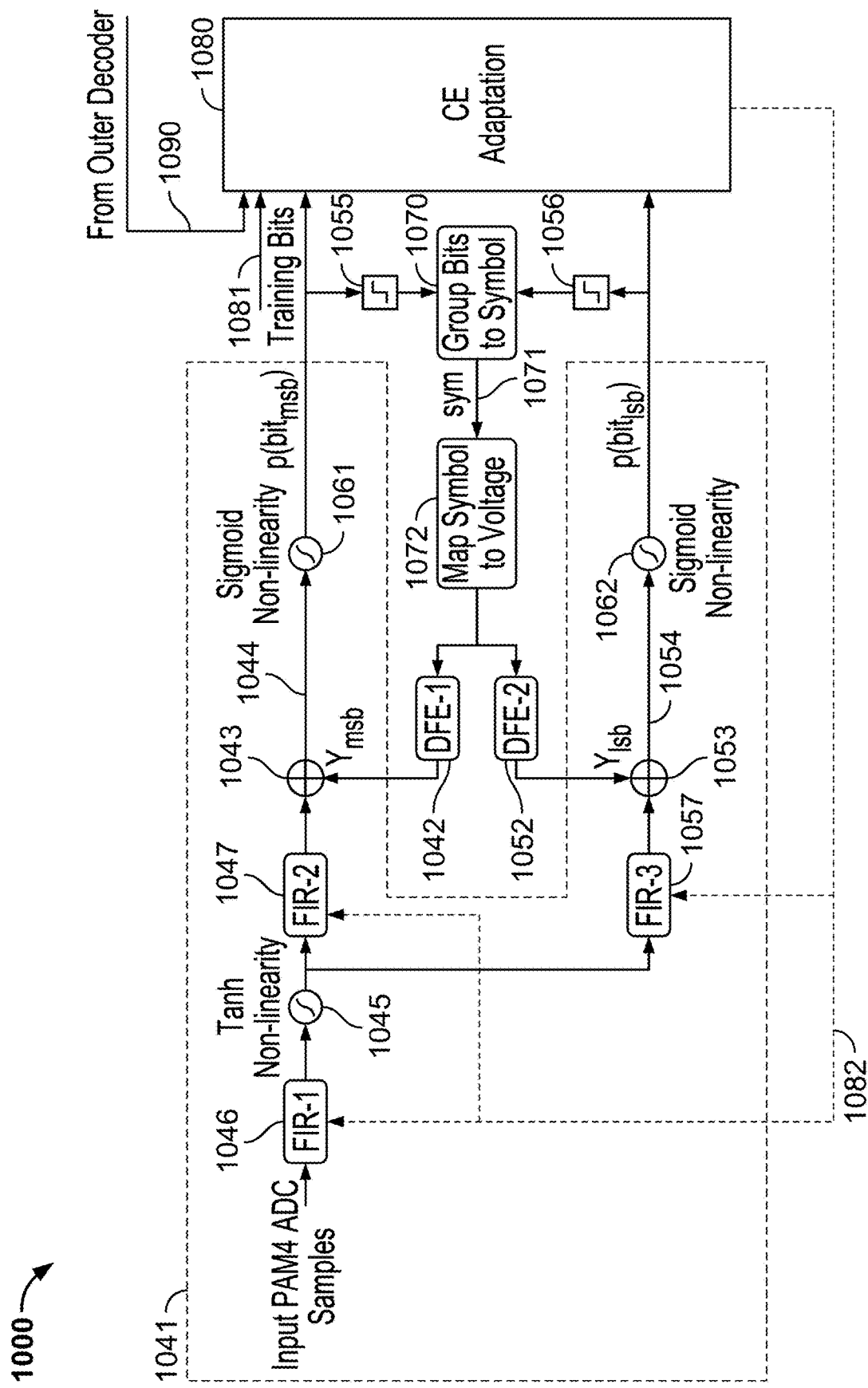
FIG. 10 is a diagram of a sixth implementation of a receiver incorporating the subject matter of this disclosure.

FIG. 10 shows an implementation 1000 of a receiver 211 according to the subject matter of this disclosure including a reduced-complexity multi-layer perceptron neural network 1041 which decorrelates the two bits in a PAM4 symbol, coupled with a respective decision-feedback equalizer 1042, 1052 for each respective bit.

Reduced-complexity multi-layer perceptron neural network 1041 includes a first feed-forward filter 1046, which may, e.g., be a finite impulse response (FIR) filter. A non-linear activation function 1045 (e.g., a hyperbolic tangent activation function, tan h $(f)$, although other non-linear activation functions may be used) is applied to the output of feed-forward filter 1046 which is then input to a second feed-forward filter 1047, and in parallel to third feed-forward filter 1057. Each of feed-forward filters 1047, 1057 produces a respective equalized bit output $Y_{msb}$ 1044, and $Y_{lsb}$ 1054.

A respective non-linear activation function 1061, 1062, different from non-linear activation function 1045, is applied to each respective equalized bit output $Y_{msb}$ 1044, and $Y_{lsb}$ 1054. Non-linear activation functions 1061, 1062 may be, instead of a hyperbolic tangent activation function, a sigmoid function having a profile similar to that of tan h $(f)$, but ranging from 0 to +1 rather than from −1 to +1.

Non-linear activation function 1061 provides a probability estimate $p(bit_{msb})$ for the most significant bit of the two bits in a symbol, and non-linear activation function 1062 provides a probability $p(bit_{lsb})$ estimate for the least significant bit of the two bits of the symbol. Each of the two probability estimates is then compared in a respective slicers 1055, 1056 to a threshold value of 0.5 to a obtain bit estimate (e.g., bit=0 if p<0.5 and bit=1 if p≥0.5) for each bit in the symbol.

At 1070, the two bits are grouped into a symbol 1071, and then converted to a corresponding voltage at 1072 (e.g., −1 for '00', −⅓ for '01', +⅓ for '10' and +1 for '11') for input to decision feed-back equalizer 1042 in the most-significant-bit path, and to decision feed-back equalizer 1052 in the least-significant-bit path. The output of each respective decision feed-back equalizer 1042, 1052 is combined at 1043, 1053, respectively, with the output of respective feed-forward filter 1047, 1057 to mitigate inter-symbol interference from a previous symbol, to yield the respective equalized bit outputs $Y_{msb}$ 1044, and $Y_{lsb}$ 1054 that are, as described above, input to non-linear activation functions 1061, 1062 to yield.

Cross-entropy may be determined, from $p(bit_{msb})$, $p(bit_{msb})$, and training bits 1081 or outer decoder output 1090, in cross-entropy adaptation circuitry 1080 by, as in the case of implementation 900, first determining the log-likelihood ratios from the probability estimates as described above. Starting with the most significant bit, where $P_0$ is $p(bit_{msb=0})$ and $P_1$ is $p(bit_{msb=1})$, LLR $(bit_{msb})$ can be computed. CE $(bit_{msb})$ can then be computed from LLR$(bit_{msb})$ and the most significant bit of the training bits or the outer decoder bits. Then using $p(bit_{lsb=0})$ as $P_0$ and $p(bit_{lsb=1})$ and $P_1$, LLR$(bit_{lsb})$ can be computed. CE$(bit_{lsb})$ can then be computed from LLR$(bit_{lsb})$ and the least significant bit of the training bits or the outer decoder bits. The bit level cross-entropy is the sum of CE $(bit_{msb})$+CE $(bit_{lsb})$.

Figure 11:
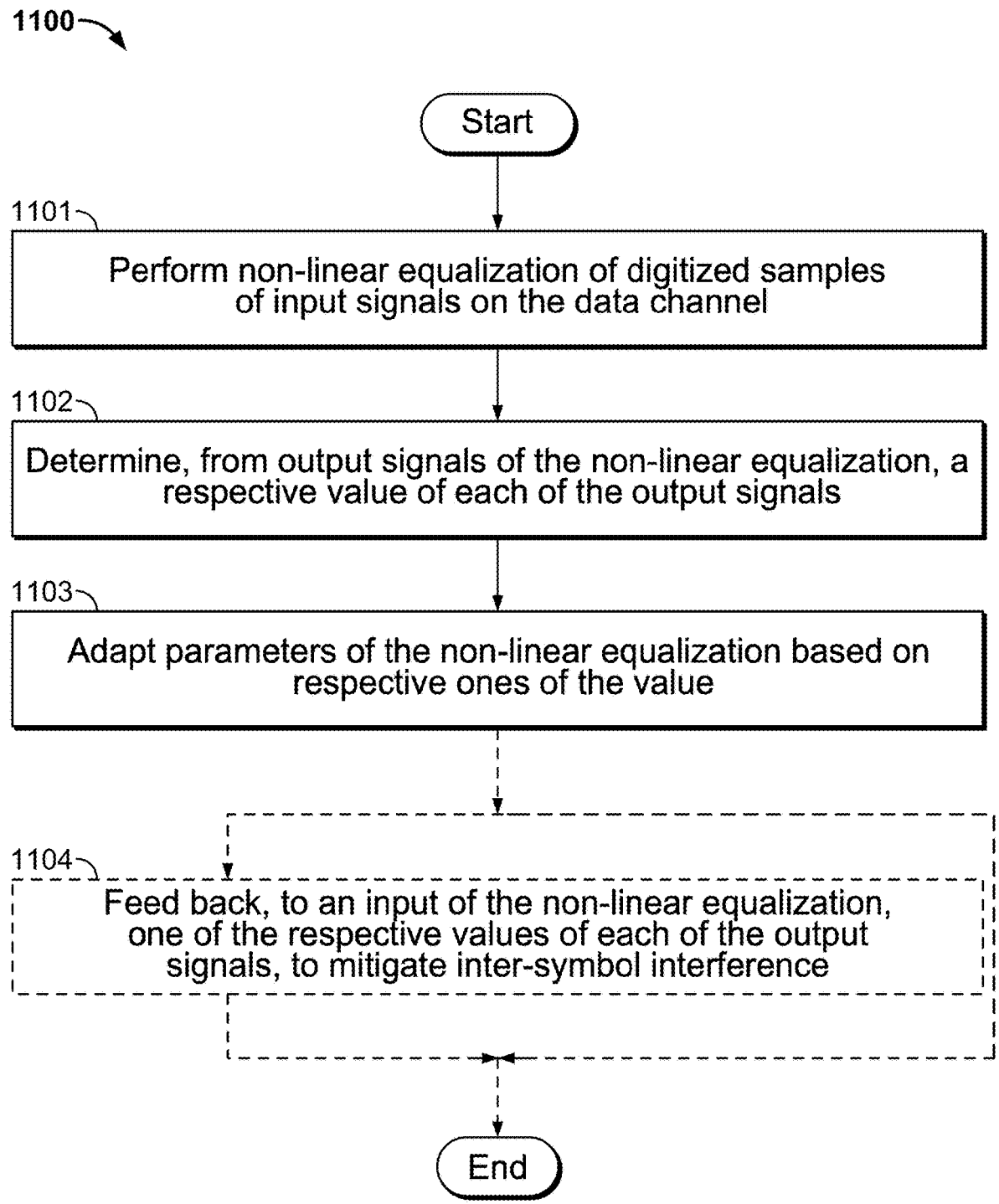
FIG. 11 is a flow diagram illustrating a method according to implementations of the subject matter of this disclosure.

A method 1100 according to implementations of the subject matter of this disclosure is diagrammed in FIG. 11.

Method 1100 begins at 1101 where non-linear equalization is performed on digitized samples of input signals on the data channel. At 1102, a respective value of each of the output signals of the non-linear equalization is determined. At 1103, parameters of the non-linear equalization are adapted based on respective ones of the value. As noted above, the adaptation may be based on minimizing mean square error (e.g., between the output value and a target value), or on minimizing cross-entropy (e.g., between an output value and its log-likelihood ratio). After the adaptation, method 1100 may end or, optionally, at 1104 one of the respective values may be fed back to an input of the non-linear equalization to mitigate inter-symbol interference during processing of the next symbol, and then method 1100 ends.

Thus it is seen that a high-speed data channel using a non-linear equalizer has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A receiver for use in a data channel on an integrated circuit device, the receiver comprising:
   a non-linear equalizer having as inputs digitized samples of signals on the data channel;
   decision circuitry configured to determine from outputs of the non-linear equalizer a respective value of each of the signals by determining from respective candidate symbols an output symbol and a log-likelihood ratio of the output symbol; and
   adaptation circuitry configured to adapt parameters of the non-linear equalizer based on respective ones of the value, the adaptation circuitry comprising:
   circuitry configured to determine from the respective candidate symbol a respective output symbol and a log-likelihood ratio of the respective output symbol, and
   circuitry configured to minimize cross-entropy between the respective output symbol and the log-likelihood ratio of the respective output symbol.

2. The receiver of claim 1 further comprising feedback circuitry configured to feed back, to an input of the non-linear equalizer, a value output by the decision circuitry to mitigate inter-symbol interference.

3. The receiver of claim 2 wherein the feedback circuitry comprises a decision-feedback equalizer.

4. The receiver of claim 1 wherein the non-linear equalizer is a neural network equalizer.

5. The receiver of claim 4 wherein the neural network equalizer is a multi-layer perceptron neural network equalizer.

6. The receiver of claim 5 wherein the multi-layer perceptron neural network equalizer is a reduced complexity multi-layer perceptron neural network equalizer.

7. The receiver of claim 1 wherein the decision circuitry comprises thresholding circuitry.

8. The receiver of claim 7 wherein:
   the decision circuitry operates on symbols; and
   the thresholding circuitry has a plurality of thresholds and selects a symbol from a plurality of symbols based on values of outputs of the non-linear equalizer relative to the thresholds.

9. The receiver of claim 7 wherein:
   the decision circuitry operates on bits;
   the non-linear equalizer outputs a probability estimate for each bit; and
   the thresholding circuitry assigns a value to each bit based on a comparison of the probability estimate to 0.5.

10. The receiver of claim 1 wherein the non-linear equalizer comprises a linear filter and an non-linear activation function.

11. The receiver of claim 10 wherein the non-linear activation function is a hyperbolic tangent function.

12. The receiver of claim 10 wherein the non-linear activation function is a sigmoid function.

13. A method for detecting data on a data channel on an integrated circuit device, the method comprising:
   performing non-linear equalization of digitized samples of input signals on the data channel;
   determining from output signals of the non-linear equalization a respective value of each of the output signals, each respective value representing a respective candidate symbol; and
   adapting parameters of the non-linear equalization based on respective ones of the value, by:
   determining from each respective candidate symbol an output symbol and a log-likelihood ratio of the output symbol, and
   minimizing cross-entropy between the output symbol and the log-likelihood ratio of the output symbol.

14. The method of claim 13 further comprising feeding back, to an input of the non-linear equalization, one of the respective values output by the determining, to mitigate inter-symbol interference.

15. The method of claim 13 wherein performing the non-linear equalization comprises:
   performing linear equalization; and
   applying a non-linear activation function to signals output by the linear equalization.

16. The method of claim 13 wherein:
   each respective value output by the determining represents a respective candidate bit of an output symbol;

the determining from each respective candidate symbol a respective output symbol and a log-likelihood ratio of the respective output symbol comprises:
determining from each respective candidate bit a respective output bit and a log-likelihood ratio of the respective output bit; and
the minimizing cross-entropy between the output symbol and the log-likelihood ratio of the output symbol comprises:
minimizing cross-entropy between each respective candidate bit and the log-likelihood ratio of the respective output bit.

17. Apparatus for detecting data on a data channel on an integrated circuit device, the apparatus comprising:
means for performing non-linear equalization of digitized samples of input signals on the data channel;
means for determining, from output signals of the means for performing non-linear equalization, a respective value of each of the output signals, each respective value output by the means for determining representing a respective candidate symbol; and
means for adapting parameters of the non-linear equalization based on respective ones of the value, comprising:
means for determining from the respective candidate symbol a respective output symbol and a log-likelihood ratio of the respective output symbol, and
means for minimizing cross-entropy between the respective output symbol and the log-likelihood ratio of the respective output symbol.

18. The apparatus of claim 17 further comprising means for feeding back, to an input of the means for performing non-linear equalization, one of the respective values output by the means for determining, to mitigate inter-symbol interference.

19. The apparatus of claim 17 wherein the means for performing the non-linear equalization comprises:
means for performing linear equalization; and
means for applying a non-linear activation function to signals output by the means for performing linear equalization.

20. The apparatus of claim 17 wherein:
each respective value output by the means for determining represents a respective candidate bit of an output symbol;
the means for determining from the respective candidate symbols an output symbol and a log-likelihood ratio of the output symbol comprises means for determining from each respective candidate bit a respective output bit and a log-likelihood ratio of the respective output bit, and
the means for minimizing cross-entropy between the output symbol and the log-likelihood ratio of the output symbol comprises means for minimizing cross-entropy between each respective candidate bit and the log-likelihood ratio of the respective output bit.

* * * * *